July 6, 1965
F. RUKAVINA
3,192,565
AUTOMATIC RIM ROLLING APPARATUS
Filed Aug. 20, 1962
2 Sheets-Sheet 1
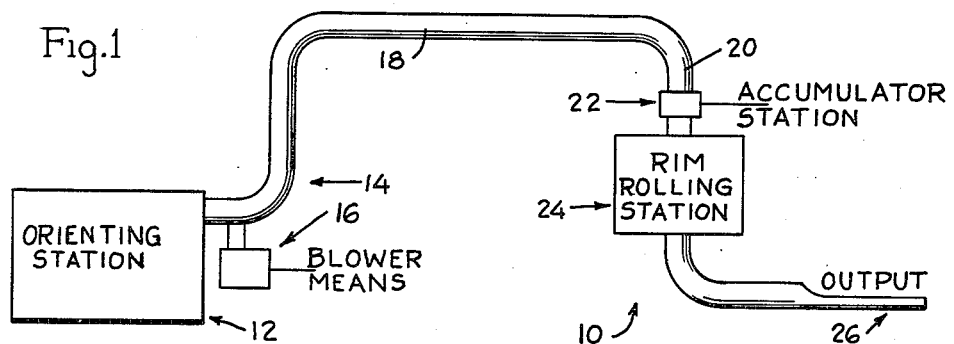
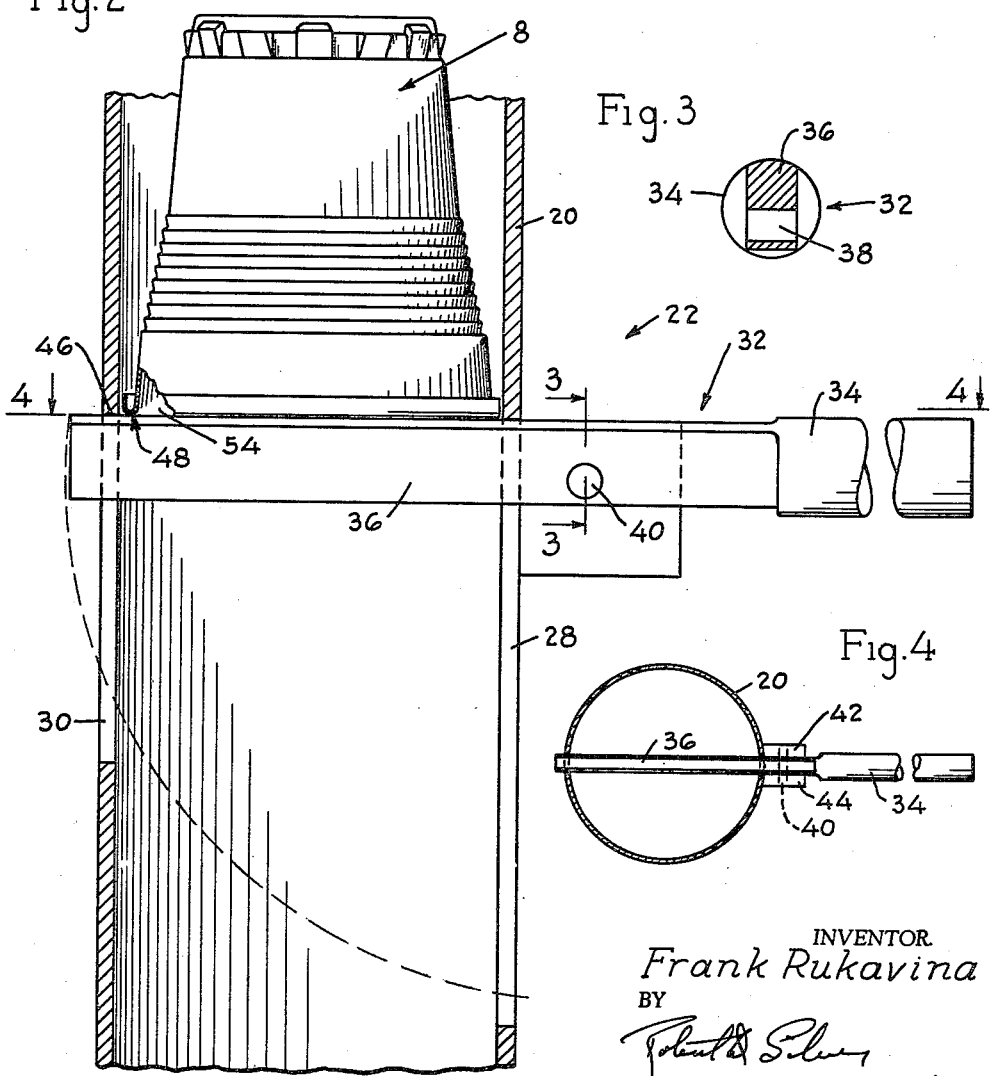
INVENTOR.
Frank Rukavina
BY
ATTY.

July 6, 1965        F. RUKAVINA        3,192,565
AUTOMATIC RIM ROLLING APPARATUS
Filed Aug. 20, 1962        2 Sheets-Sheet 2
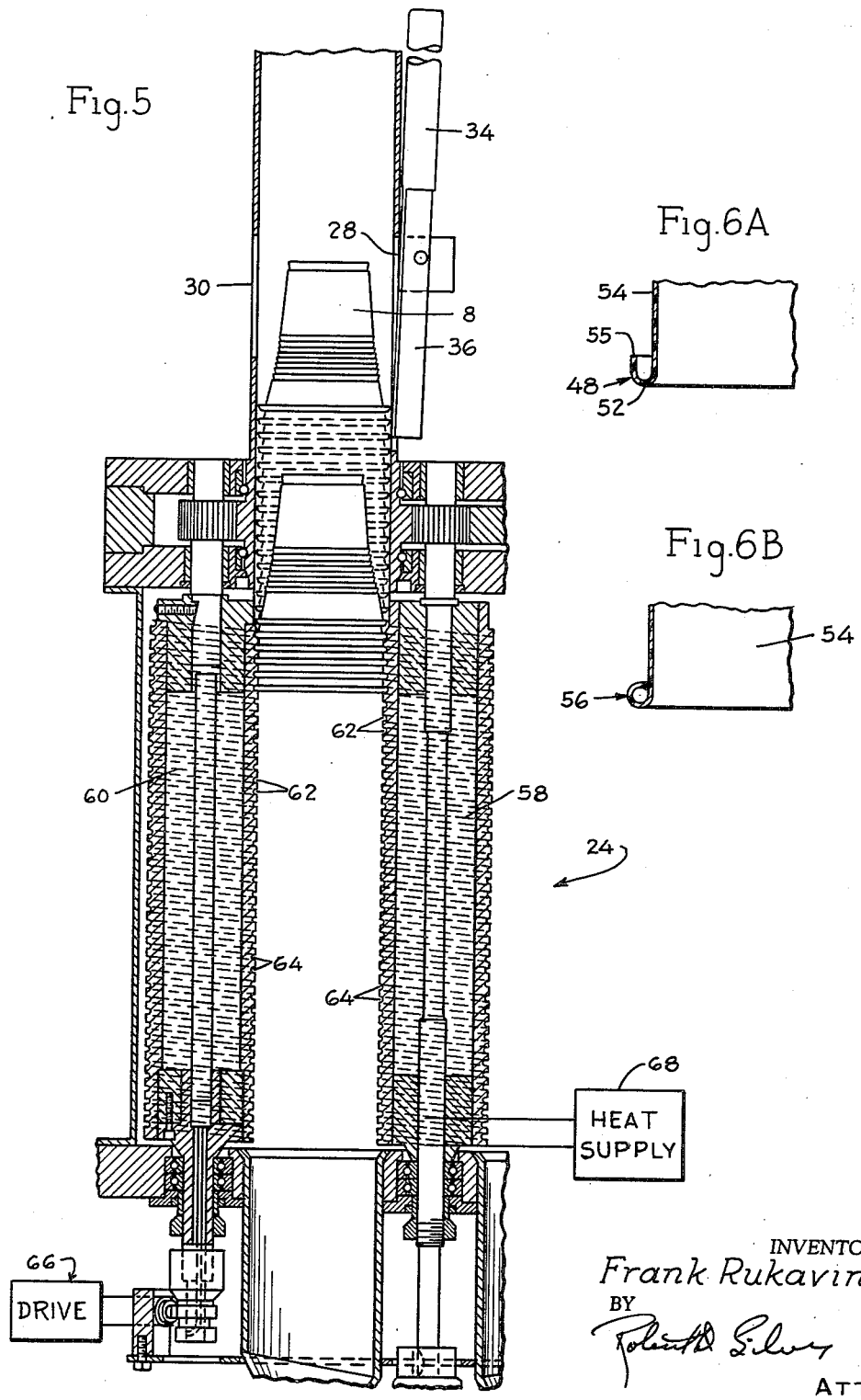
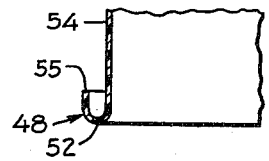
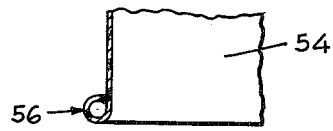
INVENTOR.
Frank Rukavina United States Patent Office 3,192,565
Patented July 6, 1965

3,192,565
AUTOMATIC RIM ROLLING APPARATUS
Frank Rukavina, Des Plaines, Ill., assignor to Illinois Tool Works Inc., Chicago, Ill., a corporation of Delaware
Filed Aug. 20, 1962, Ser. No. 218,075
6 Claims. (Cl. 18—19)

This invention relates to a method and apparatus for curling beads and more particularly is concerned with apparatus for automatically curling heads on extremely thin-walled plastic cups and the like which are received from an intermittent source.

Thin wall plastic cups and containers have many advantages over conventional paper cups or containers in that they are moisture-proof and extremely light in weight while of adequate strength. When the cup blanks are cut from a plastic sheet during formation thereof, a certain amount of flash is left by the molding apparatus along the cut edge and this presents a sharp edge often knife-like in character. To guard against injury to fingers and to the mouth and to further strengthen the cup or other container, the edge of the cup is folded over to provide a rolled lip with the previously mentioned cut edge positioned in an inaccessible position next to the cup body.

While this invention will be discussed relative to a plastic cup for association with vending machines, it is to be especially noted that other types of plastic containers such as ice cream containers, cottage cheese containers, and other packaging containers are expressly contemplated.

The plastic cups are molded in a machine at a rate which often exceeds 300 per minute and the characteristic of the molding machine is such that the cups are delivered in batches of 12, 16, or 25. For fast removal of the batches of cups in the molding machine, it has been found advantageous to blow the cups, which are extremely light in weight, from the molding area to an orienting station which orients all of the cups in a particular position. A preferred type of orienting apparatus is of the type set forth in the co-pending application Serial No. 39,009 filed June 27, 1960, now Patent No. 3,086,822, granted April 23, 1963, and assigned to the same assignee. From the orienting station, the cups are transported by automatic means to a rim rolling station. The rim rolling apparatus includes a plurality of axially aligned rollers circumferentially spaced around a central aperture, each roller having a spiral groove which engages the rim of the molded cup and distorts the rim to its final shape; at least one of the rollers is heated.

It is most important to have an accumulator station disposed a short distance vertically above the rim rolling apparatus to accumulate a plurality of cups as received from the orienting station so that a stack of cups will be presented to the rim rolling apparatus. This is important since when the cups are in stacked position the individual cups within the stacks are prevented from becoming cocked, and cross threading engagement of the rims of an individual cup with the rollers in the rim rolling apparatus is prevented.

It is a general object of this invention to provide a method and apparatus for automatically rolling rims on thin plastic containers in a fast, repetitive, trouble-free manner at high operating speeds.

It is another object of this invention to provide a method and apparatus for receiving lightweight plastic containers from an intermittent source, accumulating a predetermined number of containers at a station, and then feeding the containers so accumulated to the rim rolling apparatus.

A still further object of this invention is to provide an accumulator means which is work dependent rather than time dependent, which is simple in operation, easy to construct, and well adapted for the purposes for which it is designed.

The novel features that are considered characteristic of this invention are set forth with particularity in the appended claims. The invention itself, however, both as to its organization and its method of operation, together with additional objects and advantages thereof, will be best understood by the following description of the specific embodiment when read in connection with the accompanying drawings, in which:

FIG. 1 is a schematic view of apparatus for practicing the invention, the flow of cups through the apparatus being from left to right;

FIG. 2 is an enlarged view, partially in section, showing the accumulator station of the apparatus;

FIG. 3 is a sectional view along lines 3—3 of FIG. 2;

FIG. 4 is a sectional view along lines 4—4 of FIG. 2;

FIG. 5 is a sectional view of the apparatus including the accumulator and the rim rolling station;

FIG. 6A is a fragmentary view of the rim portion of a cup as it is received from a molding machine prior to the rolling of the rim thereon; and FIG. 6B is a fragmentary sectional view of the rim portion of a cup after the rim has been rolled thereon by the apparatus shown in FIG. 5.

Cups 8 are received from a molding machine (not shown) and are oriented and have the rims rolled thereon by an apparatus 10 in an automatic manner as about to be discussed. More particularly, the apparatus 10 comprises an orienting station 12 of the type set forth in the aforementioned co-pending application S.N. 39,009 filed the 27th day of June 1960, now Patent No. 3,086,-822, granted April 23, 1963, and assigned to the same assignee, a transporting means 14 including a bowler means 16 and a tube means 18 which receives the output from the orienting station 12. The tube means 18 leads to the accumulator station 22, it being important to note that the tube means 18 has a vertical portion 20 immediately above the accumulator station 22. From the accumulator station 22, the cups are automatically passed in an accumulated batch to the rim rolling station 24 from whence they are automatically delivered with the rims rolled thereon to the output 26.

It will be appreciated that the cups 8 have their largest diameter adjacent the area where the bead is to be rolled thereon, i.e., at the mouth of the container and that the side walls thereof taper inwardly. The cups have a configuration which permits close nesting, having tapered side walls with a plurality of gripping rings therein to reduce heat transfer to the fingers of the user, and have a stacking ring area adjacent the bottom of the cup as best depicted in FIG. 2. The weight of the cups is usually in the neighborhood of 1 to 10 grams depending upon the final usage and requirements of the user. It will also be noted that the diameter of the mouth of the cup is less than the axial height thereof and that the inside of the tube 18, particularly at portion 20, has an inside diameter closely approximating the diameter of the mouth area of the cup 8. It will also be appreciated due to the tapered side walls, that an individual cup may be cocked relative to the side walls of the tube. This is particularly undesirable as shall become apparent hereinafter.

When the cups 8 leave station 12, they are preferably oriented with the mouth portion thereof leading the bottom wall portion. When the cups 8 proceed through the tube 18 and reach the accumulator station 22 under the positive pressure imparted by the blower means 16 which blows air through the tube 18, the lead cup will engage a movable abutment means at the accumulator station 22 as will be now described.

The accumulator station 22 comprises a pair of slots 28 and 30 which are formed in portion 20 and aligned with the vertical axis thereof, the two portions 20 being preferably disposed in a single diametrical plane. The slot 28 is longer than the slot 30 for purposes hereinafter appearing. The movable abutment means 32 is in the form of a pivotal lever means having a counterbalance portion 34 and a narrower cup engaging portion 36, the latter extending through the slots 28 and 30 as shown in FIGS. 2 and 4. The narrower portion 36 has a through bore 38 for receipt of the pivot pin 40 which is mounted to a pair of spaced bracket means 42 and 44 adjacent to the upper end of the slot 28. The lever means 32 may be made of nylon or any other suitable material, it being preferred that the material is the type which is relatively rigid and has a relatively smooth surface. The disposition of the through bore 38 for mounting the pivot pin is such that the lever will assume an at-rest position in engagement with the top of slot 30 and the end of the lever means 32 extending through the slot 30 is of such length that it may be pivoted so it can completely clear both slots to take a vertically aligned position to tube portion 20 such as shown in FIG. 5. The exact amount of material by which portion 34 exceeds the amount of material 36 may be varied to suit depending upon the number of cups desired to be accumulated. Further, additional counterweights may be hung if desired on portion 34 as is apparent. In cups of the type and size shown in FIG. 2, it has been found in actual practice that it is desirable to accumulate at least four or five cups in stacked nested relation as shown in FIG. 5, the accumulated weight thereof being sufficient to cause the lever to pivot to the position shown in FIG. 5. A stack of five cups gives sufficient axial dimension to the plurality of cups so that the bottommost cup will not become cocked relative to the grooved rollers in the rim rolling apparatus. As will be apparent, the lever means is work dependent rather than time dependent. In other words, it is the weight of the accumulated cups themselves which causes the lever to move so as to clear the tube to allow the cups to drop on down for entry into the rim rolling apparatus. The speed of the rim rolling apparatus is such that if a cup should come through the tube while the lever is starting to return to the position shown in FIG. 2, the cup will become centered on a cup which has not yet reached the entering threads on the rim rolling apparatus. In other words, there is sufficient height between the bottom of the uppermost cup in a stack which has passed the lever so that as the lever starts to clear same as versus the speed of the rim rolling apparatus such that if a cup comes down while the lever is returning and causes it to again swing out to the position shown in FIG. 5, the cup will not hit the entering thread but will hit the cups that are still awaiting entry into the rim rolling apparatus. Cocking is prevented because the relatively greater dimension of the mouth of the cup relative to the narrower dimension of the bottom causes a late coming cup to center itself on the next cup so that it will not in turn be cocked when it reaches the rim rolling apparatus.

The rim rolling station 24 is adapted to roll the rim area 48 of the cup 8 having the rather sharp edge 50 which is spaced from the side wall 54 on the cup 8. This edge 50 is turned back toward the mouth portion 52 to provide the rolled bead 56 shown in FIG. 6B. The rim rolling apparatus essentially comprises a plurality of axially aligned rollers such as 58 and 60 (it being preferable that there be at least a total of four rollers similar to rollers 58 and 60) with at least one roller being heated as shown semidiagrammatically at 68. The individual rollers 58 and 60 are adapted to be rotated about their respective axis by suitable drive means shown semidiagrammatically with the reference numeral 66. Each roller has a spiral groove such as shown at 62, the width of which varies progressively along the axial extent so that at 64 it is smaller in size to cause the rim to be rolled into the closed formation as shown in FIG. 6B. The disposition of the grooves 62 near the top of the roller is such as to cause a slight denesting of adjacent containers in the stack received from the accumulator means so that each cup is individually free of the next adjacent cup during the rim rolling operation. It is important to note that the grooves 62 and 64 are such as to cause only axial forces on portions 50 and 52 of the cup rather than supplying any radially inward component of force. This is important because essentially there is nothing to provide a reaction force to the relatively open mouth of the container in area 48 during the rim rolling operation and if the forces are not all substantially axial on portions 50 and 52, the net result is to cause the container to go through the rim rolling apparatus without any change in form. The heating of at least one and preferably all of the rollers serves to cause the plastic material to become moldable to aid in deformation thereof so as to retain its finally deformed shape 56. It will be noted that the narrowing of the width of the grooves 62 at 64 is such as to provide a camming action upon the rim portion 48 of the cup as it is received from the accumulator.

It is to be understood that the specific embodiment of the invention as herein shown and described is for illustrative purposes only. Various changes in structure will no doubt occur to those skilled in the art and are to be understood as forming a part of this invention insofar as it follows in the spirit and the scope of the appended claims.

I claim:

1. The method of automatically rolling rims on thin flexible tapered containers having a wide mouth portion and a closed end portion comprising the steps of orienting the individual containers so that the mouth thereof all face substantially the same direction, pneumatically moving the oriented containers along the axis of the containers while preventing radial movement thereof to an accumulator station to accumulate a predetermined number of containers in nested stacked relation to provide a stack of predetermined height, releasing the predetermined height stack of containers responsive to the weight thereof to rim rolling rollers having spiral grooves therein, the stacked containers as a stack providing self orientation to prevent cross threading engagement of individual containers with the spiral grooves in said rim rolling rollers.

2. Apparatus for preventing cocking of individual nestable tapered containers having a wide mouth being fed to a rim rolling apparatus adapted to roll rim beads on thin flexible plastic containers comprising tube means for receipt of intermittently supplied individual containers, an accumulator means associated with and forming an abutment means in said tube means, and a rim rolling station means adjacent the output end of said tube means, said accumulator means comprising abutment means responsive to the presence of a plurality of containers in nested relationship operable to move to a non-interrupting position outside of said tube means upon the accumulation of a predetermined number of containers at said station, said abutment means being movable in a plane parallel with the axis of said tube means, said plurality of containers in nested relationship as a group providing a self-orientation preventing cocking of the individual containers.

3. Apparatus for automatically forming a rolled under lip on a platsic cup or the like of the type having a side wall terminating in an outwardly and downwardly projecting circumferential rim, said apparatus comprising tube means for receiving individual cups intermittently individually fed in an oriented manner from a source, rim rolling means comprising cam means for engaging said rim, said means including a plurality of rollers, each of said rollers carrying a spiral groove which receives said rim, means for heating selected rollers, drive means operating said camming means to progressively deflect the rim toward said side wall as the cup is made to revolve about its own axis while being fed through said rollers, and accumulator means located at a station vertically above said rim rolling means, said accumulator means comprising tube means having a portion disposed in a substantially vertical plane, first and second diametrically opposed slot means formed in the side walls of the tube means and aligned with the axis of said tube means, said first slot means having an axial dimension at least as great as the diameter of said tube means, bracket means mounted exteriorly of said first slot means, and lever means movably mounted on said bracket means having a first portion extending through said first and second slot means and a second portion exterior of said first slot means, said first portion of said lever means having a normal at-rest position extending across said tube means to provide a movable abutment for retaining containers moving in said tube means, said lever means remaining at said at-rest position until the accumulation of a predetermined number of containers in stacked nested relationship aligned thereon whereupon the lever means piovts out of the way to feed said cups to said rim rolling means, the stack of containers so presented to the rim rolling apparatus preventing cross threading of the individual containers during the rolling of the rim thereon.

4. Apparatus for automatically rolling rims on thin, flexible containers of the nestable variety comprising means at a station for orienting containers received from an intermittent source, means transporting the oriented containers as intermitently received from the orienting station to an accumulator station, means at the accumulator station for automatically accumulating a preselected number of containers in nested relationship and upon attainment of that number releasing the accumulated containers for movement as a group to a rim rolling station, and means at the rim rolling station axially aligned with said accumulator means for receiving the accumulated containers and rolling rims thereon, said nested group of containers preventing individual container misalignment at said rim rolling station.

5. The method of forming a rolled under lip on nestable plastic cups or the like of the type each having a tapering side wall and terminating in an outwardly and downwardly projecting circumferential rim, which method is characterized by the steps of individually orienting the cups and intermittently moving same to an accumulator station, accumulating a predetermined number of cups in a nested stack of predetermined height at said accumulator station, releasing the stacked cups and directing the same along a predetermined path to a rim rolling station located in said predetermined path upon the accumulation of a predetermined number of stacked cups, slightly de-nesting said cups at said rim rolling station in sequence to allow free relative rotation thereof while simultaneously engaging the rim of each individual cup on the top and bottom portions thereof at a plurality of spaced positions, and progressively bringing the engaged portions together in order to deflect said bottom portion toward said top portion and toward said side wall, the feeding of said cups in a nested stack preventing cocked relationship of individual cups at the means for engaging the individual cups during the de-nesting thereof.

6. A method of automatically forming a rolled under lip on nestable plastic cups or the like of the type each having a tapering side wall terminating in an outwardly and downwardly projecting circumferential rim, which method is characterized by the steps of moving individual containers intermittently received from a source toward an accumulator station, accumulating a predetermined number of cups at said station in nested stacked relation, releasing said cups from said accumulator station responsive to the presence of a predetermined number of cups and directing said cups along a predetermined path, and sequentially engaging the rims of said cups on the top and bottom portions thereof in said predetermined path and at a plurality of equally arcuately spaced positions in a manner to progressively bring the engaged portions together in order to deflect said bottom portion toward said top portion and toward said side wall, the accumulation of the cups in nested array preventing individual misalignment of the cups while engaging same to roll the rims thereon.

References Cited by the Examiner
UNITED STATES PATENTS

| | | | |
|---|---|---|---|
| 341,552 | 5/86 | Carter | 18—56 |
| 1,961,191 | 6/34 | Bliss | 221—105 |
| 2,205,192 | 6/40 | Fry | 221—105 |
| 2,402,097 | 6/46 | Spraker | 221—295 XR |
| 2,532,844 | 12/50 | Hulbert et al. | 18—19 |
| 2,559,365 | 7/51 | Middleton et al. | 18—19 |
| 2,892,217 | 6/59 | Luboshez | 18—56 |
| 3,086,822 | 4/63 | Fibish | 302—2 |
| 3,096,546 | 7/63 | Edwards | 18—19 |

FOREIGN PATENTS 1,200,392  6/59  France.

WILLIAM J. STEPHENSON, *Primary Examiner.*

ALEXANDER H. BRODMERKEL, *Examiner.*